US012613967B2

(12) United States Patent
Gupta et al.

(10) Patent No.: US 12,613,967 B2
(45) Date of Patent: Apr. 28, 2026

(54) STATIC ANALYSIS OF CONTAINER SERVICES

(71) Applicant: Snowflake Inc., Menlo Park, CA (US)

(72) Inventors: Rishabh Gupta, San Francisco, CA (US); Hrushikesh Shrinivas Paralikar, Hayward, CA (US); Ryan Charles Quistorff, Bellevue, WA (US)

(73) Assignee: Snowflake Inc., Menlo Park, CA (US)

( * ) Notice: Subject to any disclaimer, the term of this patent is extended or adjusted under 35 U.S.C. 154(b) by 124 days.

(21) Appl. No.: 18/535,451

(22) Filed: Dec. 11, 2023

(65) Prior Publication Data

US 2025/0190568 A1 Jun. 12, 2025

(51) Int. Cl.
*G06F 21/57* (2013.01)
(52) U.S. Cl.
CPC .................................... *G06F 21/57* (2013.01)
(58) Field of Classification Search
None
See application file for complete search history.

(56) References Cited

U.S. PATENT DOCUMENTS

2024/0020390 A1* 1/2024 Wirges ................ G06F 9/45558
2024/0154993 A1* 5/2024 Andriukhin ......... H04L 63/1433

OTHER PUBLICATIONS

Docker Docs, "Docker Scout", [Online]. Retrieved from the Internet: https: docs.docker.com scout , (Accessed online Jul. 15, 2024), 2 pages.

* cited by examiner

*Primary Examiner* — Boris D Grijalva Lobos
(74) *Attorney, Agent, or Firm* — Schwegman Lundberg & Woessner, P.A.

(57) ABSTRACT

A data platform having an anti-abuse analysis pipeline is provided. The anti-abuse analysis pipeline detects an image referenced in an application package and schedules an application scan to scan application source files and generate application scan results. The anti-abuse analysis pipeline also schedules an image scan to scan the image and generate image scan results. The anti-abuse analysis pipeline extracts application source files from the application package and executes an application scan using the extracted application source files to generate application scan results. The anti-abuse analysis pipeline extracts artifacts from the referenced image and executes an image scan using the artifacts to generate image scan results. The anti-abuse analysis pipeline determines a completion of the application scan and the image scan and generates a scan result using the application scan results and image scan results.

30 Claims, 6 Drawing Sheets

STATIC ANALYSIS OF CONTAINER SERVICES

TECHNICAL FIELD

Examples of the disclosure relate generally to databases and, more specifically, to security of applications executing on a data platform.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems. Users may develop applications that execute on data platforms. It is desirable to safeguard the security of the data platform during application deployment.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
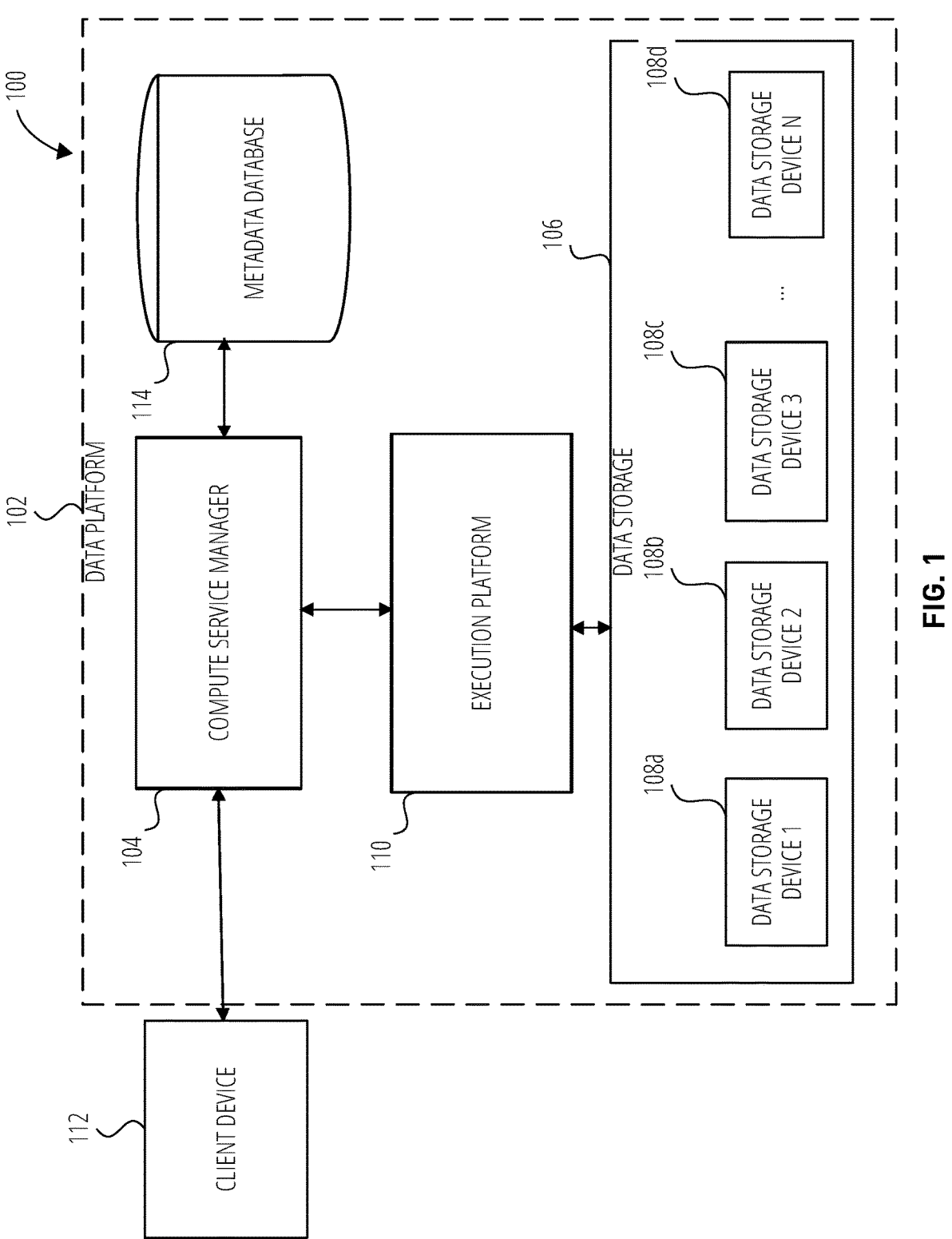
FIG. 1 illustrates an example computing environment that includes a network-based data platform in communication with a cloud storage provider system, according to some examples.

An operator of a data platform may provide an application framework for users of a platform to develop their own applications that run on the data platform. Furthermore, some users may want to be content providers that provide applications and content to other users on the data platform who are consumers of the content. This enables providers to build, monetize and deploy data-intensive applications in a data platform marketplace. Such as marketplace allows consumers to discover and install applications natively within their data platform accounts. Although the application framework provides data platform providers with a platform to build their data-intensive applications, it also introduces an inherent risk of malicious actors exploiting this framework to build malicious applications that pose multiple abuse threats, including, but not limited to, data exfiltration, account compromise, intellectual property theft, and misuse of consumer's compute/storage. Even well-intended application providers can inadvertently create insecure applications that can be exploited by malicious consumers or attackers to exfiltrate provider IP and abuse the data platform and its customers. If these kinds of scenarios were to happen, it would lead to a poor experience for data platform customers with a loss of reputation for the operator of the data platform.

Traditional application security reviews rely on scanning source code with static analysis tools using predefined rule sets. However, modern applications utilize container images that encapsulate dependencies and configuration. Existing tools fail to adequately analyze these container images in the context of the full application architecture.

In some examples, a data platform provides an integrated application and container image scanning pipeline. The data platform coordinates a primary application source code scan with secondary scans of referenced container images. An image extraction process uploads container images and extracts source artifacts. The data platform runs configured scanners over the application source and image artifacts, aggregating results to derive an overall security verdict as scan results. Generation of the scan results considers the scans in combination, identifying potential abuses undetectable by individual scans. By natively handling container images as application dependencies, an integrated analysis pipeline improves detection accuracy while optimizing performance through caching and scan result sharing.

In some examples, an anti-abuse analysis pipeline detects that a provider has submitted a new application package to the platform marketplace and parses associated manifests to identify container images referenced by the application. For each image discovered, the pipeline schedules a secondary scan that will analyze the image itself, while also scheduling a primary scan focused on the core application source code.

To enable the secondary scans, the anti-abuse analysis pipeline extracts relevant files and artifacts from the referenced container images. The anti-abuse analysis pipeline pulls the images from storage and runs tools to determine what content needs to be analyzed further. These artifacts are then uploaded into a staging area for the scanning process. With the artifacts in place, the anti-abuse analysis pipeline executes a series of scanners configured with rules designed to detect vulnerabilities, malware, policy violations, and other issues that could lead to data platform abuse. These rules run over both the original application source code in the primary scan and the extracted image artifacts in each secondary scan.

Once the primary and all secondary scans have completed, the anti-abuse analysis pipeline analyzes the scan results collectively to identify patterns of abuse that may not be evident in the individual scans alone. By evaluating scans as an interrelated set, the anti-abuse analysis pipeline can derive verdicts with higher confidence levels. Finally, the anti-abuse analysis pipeline generates an overall verdict for the full application package by selecting the most severe issue uncovered across either the primary scan or any secondary scan.

Throughout this integrated process, the anti-abuse analysis pipeline optimizes performance by caching container images to avoid redundant retrieval and sharing scan results across applications referencing the same images. By coordinating multiple parallel scanning workflows, the anti-abuse analysis pipeline maximizes accuracy while minimizing unnecessary work.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, according to some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 1 108a, data storage device 2 108b, data storage device 3 108c, and data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 include data of metrics describing usage and access by providers and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
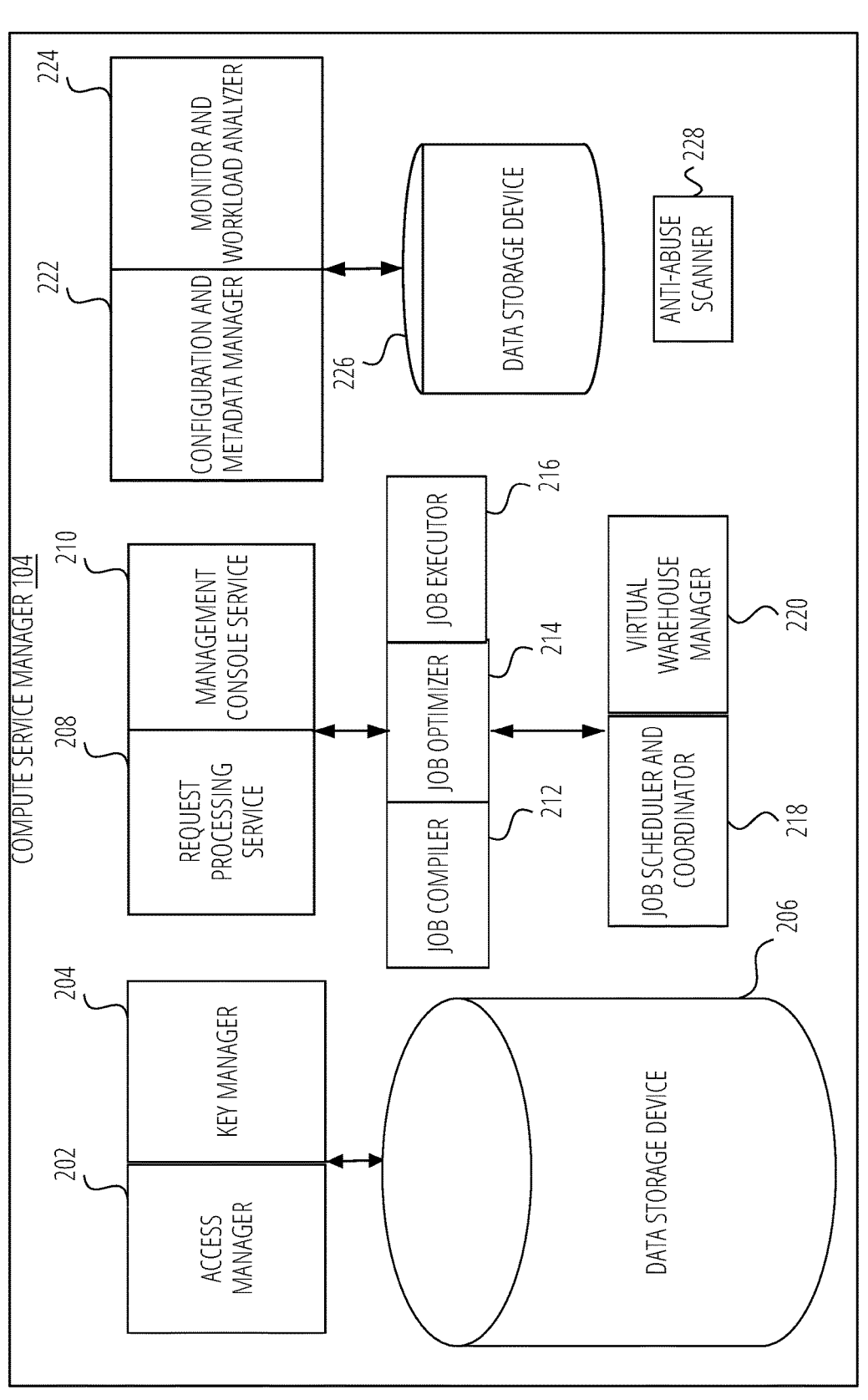
FIG. 2 is a block diagram illustrating components of a compute service manager, according to some examples.

FIG. 2 is a block diagram illustrating components of the compute service manager 104, according to some examples. As shown in FIG. 2, the compute service manager 104 includes an access manager 202, and a key manager 204. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage data storage device 206). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304*a*) may need to communicate with another execution node (e.g., execution node 2 304*b*), and should be disallowed from communicating with a third execution node (e.g., execution node 1 316*a*) and any such illicit communication can be recorded (e.g., in a log or other location). Also, the information stored on a given execution node is restricted to data relevant to the current query and any other data is unusable, rendered so by destruction or encryption where the key is unavailable.

The compute service manager 104 further comprises an anti-abuse scanner 228 that monitors creation of application packages created by content providers of the data platform 102. When a new application package is created by a content provider, the anti-abuse scanner 228 scans the application package to determine if the application package contains content that is harmful. malicious, and the like. If such content is found, the anti-abuse scanner 228 prevents release of the application package by the content provider.

In some examples, the anti-abuse scanner 228 is a component of another system that the compute service manager 104 communicates with via a network of the like.

Figure 3:
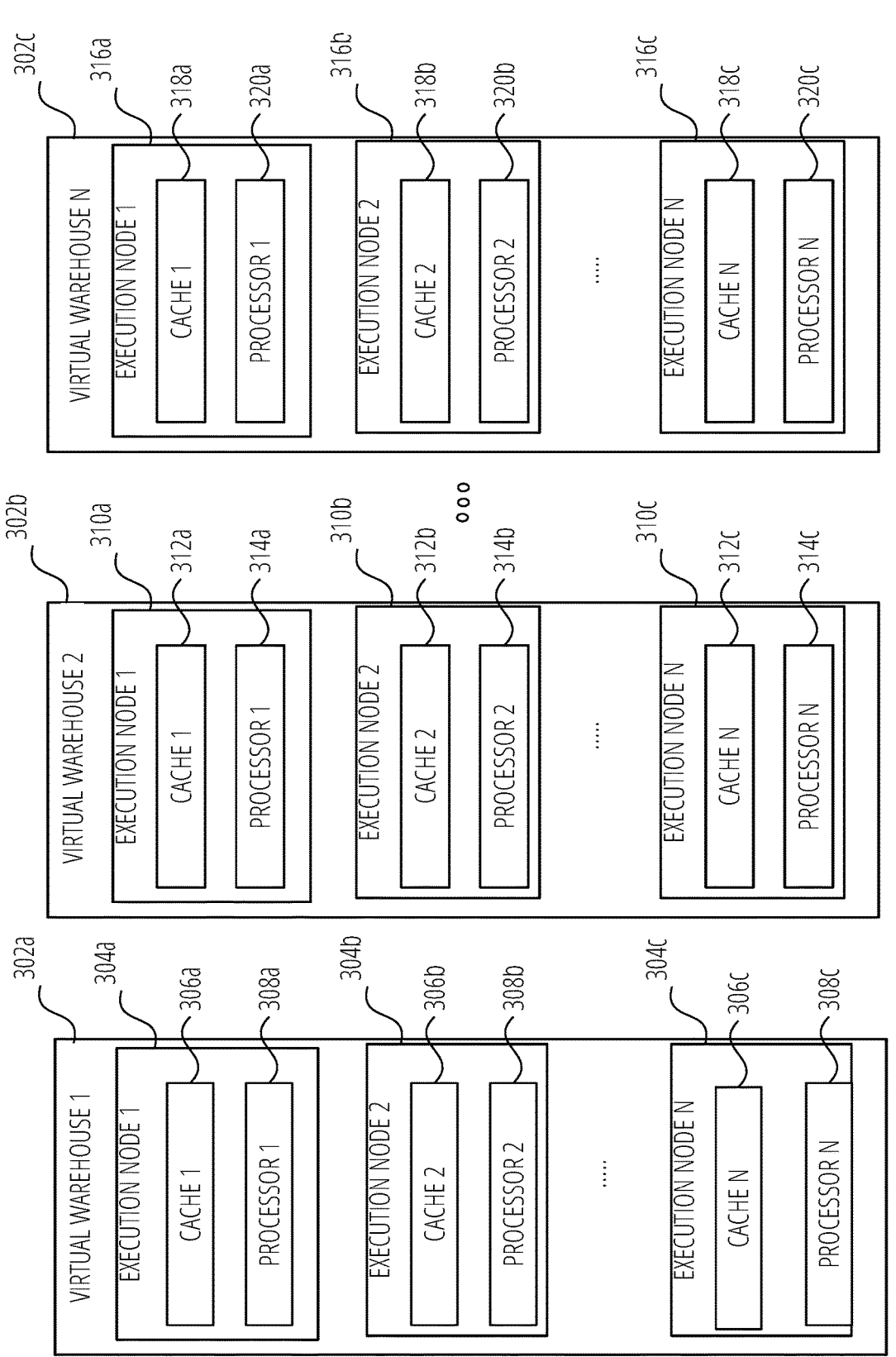
FIG. 3 is a block diagram illustrating components of an execution platform, according to some examples.

FIG. 3 is a block diagram illustrating components of the execution platform 110, according to some examples. As shown in FIG. 3, the execution platform 110 includes multiple virtual warehouses, including virtual warehouse 1 302*a*, and virtual warehouse 2 302*b* to virtual warehouse N 302*c*. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG.

3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302*a* includes a plurality of execution nodes as exemplified by execution node 1 304*a*, execution node 2 304*b*, and execution node N 304*c*. Execution node 1 304*a* includes cache 1 306*a* and a processor 1 308*a*. Execution node 2 304*b* includes cache 2 306*b* and processor 2 308*b*. Execution node N 304*c* includes cache N 306*c* and processor N 308*c*. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302*a* discussed above, virtual warehouse 2 302*b* includes a plurality of execution nodes as exemplified by execution node 1 310*a*, execution node 2 310*b*, and execution node N 310*c*. Execution node 1 304*a* includes cache 1 312*a* and processor 1 314*a*. Execution node 2 310*b* includes cache 2 312*b* and processor 2 314*b*. Execution node N 310*c* includes cache N 312*c* and processor N 314*c*. Additionally, virtual warehouse N 302*c* includes a plurality of execution nodes as exemplified by execution node 1 316*a*, execution node 2 316*b*, and execution node N 316*c*. Execution node 1 316*a* includes cache 1 318*a* and processor 1 320*a*. Execution node 2 316*b* includes cache 2 318*b* and processor 2 320*b*. Execution node N 316*c* includes cache N 318*c* and processor N 320*c*.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302a implements execution node 1 304a and execution node 2 304b on one computing platform at a geographic location and implements execution node N 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
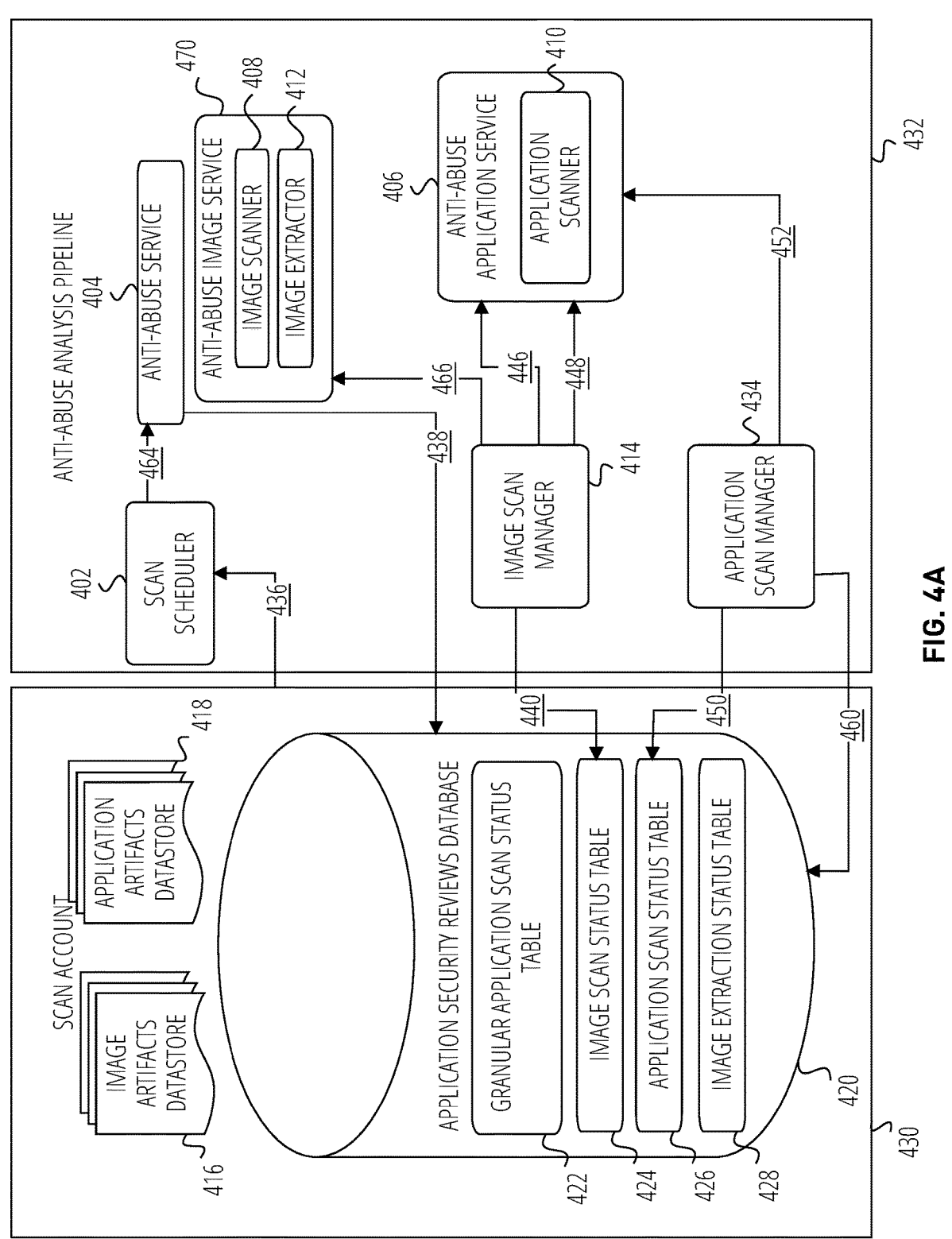
FIG. 4A is a collaboration diagram of an anti-abuse analysis pipeline, according to some examples.
Figure 4B:
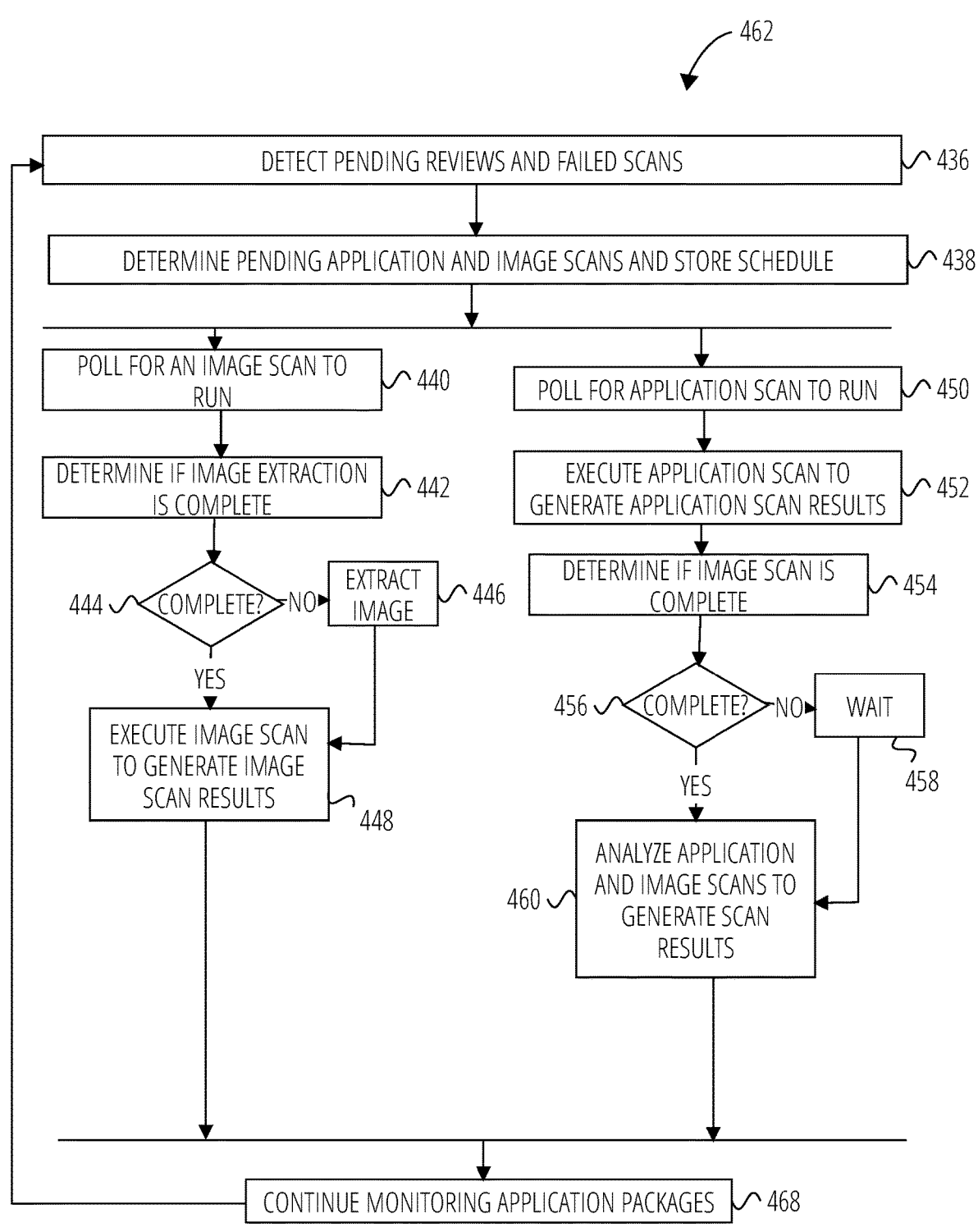
FIG. 4B is an activity diagram of an anti-abuse analysis method, according to some examples.

FIG. 4A is a collaboration diagram of an anti-abuse analysis pipeline 432 and FIG. 4B is an activity diagram of an anti-abuse analysis method 462, according to some examples. Although the anti-abuse analysis method 462 depicts a particular sequence of operations, the sequence may be altered without departing from the scope of the present disclosure. For example, some of the operations depicted may be performed in parallel or in a different sequence that does not materially affect the function of the routine. In other examples, different components of a data platform 102 (of FIG. 1) or anti-abuse analysis pipeline 432 that implements the routine may perform functions at substantially the same time or in a specific sequence.

An anti-abuse analysis pipeline 432 employs one or more types of scanners such as, but not limited to, image scanner 408 and application scanner 410, to scan images and applications for attributes that indicate various types of vulnerability or malicious intent. For example, a scanner may scan for:

Vulnerabilities such as security flaws, bugs or weaknesses in application code that could be exploited by attackers, such as SQL injection or cross-site scripting vulnerabilities.

Known malware signatures of code or images for segments of code or files that match known malware signatures.

Policy violations during usage of platform features, commands or access in ways that violate predefined security policies.

Data exfiltration in the form of potential leakage of sensitive customer or platform data outside of the system.

Account compromise threats by application code that may capture user credentials or tokens to gain unauthorized access.

Intellectual property theft through unauthorized usage or exposure of provider proprietary code, algorithms or design.

Abuse of platform resources by application code that may overload platform components through excessive computing, network or storage usage.

In operation 436, a scan scheduler 402 determines pending application and image scans and stores the scan schedule. For example, the scan scheduler 402 reads an application package and identifies any referenced images. The scan scheduler 402 then determines and writes records for scheduling both an application source code scan and an image scan to the appropriate tables of the application security reviews database 420 image scan status table 424 and operation 450 of application security reviews database 420 to indicate they are pending for execution. The scan scheduler 402 then calls 464 an anti-abuse service 404 to generate a schedule of the identified artifacts of the application package. In some examples, the scan scheduler 402 fetches a list of all active application package versions by reading an ApplicationSecurityReviewDPO objects in the scan account. These DPOs will be augmented to also include a list of all pinned image hashes, mapped to their image name In operation 438, the anti-abuse service 404 determines pending application and image scans and stores the scan schedule. For example, the anti-abuse service 404 parses the application package to identify any images referenced. For each referenced image, the anti-abuse service 404 checks if there is an existing image scan status. If not, the anti-abuse service 404 writes a new pending image scan status to an image scan status table 424 with the image hash and name. The anti-abuse service 404 also writes a pending application scan status to the application scan status table 426 to scan the application source code. In the application scan status, the anti-abuse service 404 includes the IDs of any pending image scans in the dependent_scan_ids list to indicate the application scan depends on those image scans completing first. The anti-abuse service 404 sets the primary_scan flag to true for the application scan row. This coordinates the application scan with multiple image scans by tracking their status in separate tables, while linking them together through the dependent IDs.

In some examples, the application scan status table 426 table includes columns to distinguish between image and application scans, as well as a column to indicate which scan IDs the primary application scan depends on, example columns include, but are not limited to:

image_hash STRING: Hash of the image being scanned (if the row is for an image scan)

image_name STRING: Name of the image being scanned, e.g. /tutorial_db/data_schema/tutorial_repository/my-_echo_service_image:tutorial. This is used to identify and join previously reviewed verdicts with new detected verdicts for the same image.

dependent_scan_ids ARRAY: List of scan IDs for image scans that the app scan depends on (if row is an app scan)

primary_scan BOOLEAN: Whether or not this is the primary/controller scan (if true, will wait for all secondary scans to complete)

Additionally, a SCAN_STATUS enum has a value, PENDING_EXTRACTION, to indicate that it is for an image scan of an image that still needs to be extracted.

In some examples, image scan status table 424 mirrors the application scan status table 426, but with a few changes and additions. This allows coordinating and monitoring the image scans separately from application scans. The image scan status table 424 includes a different set of scan statuses:

PENDING_COPY: status indicates the image is still being copied to our scan account PENDING_EXTRACTION: relevant files are being extracted from the image PENDING: same as SCAN_APP_STATUS, scans over the extracted files are running COMPLETE: combination of SCAN_APP_STATUS's (APPROVED/REJECTED/MANUAL_REVIEW_RE-QUIRED) statuses. This means all of the image scans have completed, unblocking the application scan manager 434 from reading all results and determining a verdict FAILED: scans were not able to be run due to the image not being copied in time or image extraction failing In some examples. The image scan status table 424 includes an image_extraction_retry_count column, to track repeated failures to extract files from the image. If this exceeds a specified threshold, marks the scan as failed.

In some examples, the image scan status table 424 includes an image_hash column, to track the hash of the image being scanned (to refer to the image extraction status table 428).

In some examples, the image scan status table 424 includes an app_scan_id column, to track which application scan an image scan corresponds to.

In some examples, the image extraction status table 428 table holds a status row per image hash, and indicates whether the anti-abuse analysis pipeline 432 has already extracted relevant files from an image hash. This table is used by the image scan manager 414 to determine if the image scan manager 414 needs to request an image extraction, thus avoiding performing an image extraction repeatedly per-scan. When an image scan is first detected, a pending row is written to this table along with a pending SCAN_APP_STATUS row by an internal application scanner 410 of the anti-abuse service 404 after extracting application code for any image hash identified in an installer script of the application package. The columns in the image extraction status table 428 include, but are not limited to, the image hash, extraction status (PENDING, SUCCESS), output datastore path where extracted files are stored, and timestamps for when extraction started and completed.

By tracking extraction status in this separate table, the image scan manager 414 can check if extraction needs to be done before calling an image extractor 412 or if the image scan manager 414 can skip that step and directly invoke 466 an image scanner 408 of the anti-abuse service 404. This allows optimized flow by avoiding unnecessary extraction calls.

In some examples, the image scanner 408 is responsible for scans that require pulling an image and scanning the image directly (vs. scans over selected extracted files from the image individually scanned using an application scanner, such as internal application scanner 410). The image scanner 408 uses a system function to fetch the endpoint and a temporary token to pull the image being scanned (if it is not already on the local filesystem), then scan it with different tools identified for one or more types of scanning. The image scan manager 414 will call image scanner 408 instead of the internal application scanner 410 for any scans the image scan manager 414 needs to run directly over images. The image scan manager 414 handles these scans directly over images through the image scanner 408. This allows the image scan manager 414 to pull images on demand using temporary credentials. The image scanner 408 then runs specialized scanners designed for detecting various types of vulnerabilities and malicious intent in images and runtimes. By providing this functionality through a distinct Remote Procedure Call (RPC), the anti-abuse analysis pipeline 432 can isolate these scans which require additional dependencies and resources for image analysis.

In some examples, the image scanner 408 handles extracting relevant source code files from an image and uploading them to an image artifacts datastore 416 datastore for scanning. The image extractor 412 pulls the image from an image repository (not shown) that stores the images referenced by applications. In some examples, container images are stored in a datastore that is a component of a data platform that hosts the anti-abuse analysis pipeline 432. In some examples, container images are stored on an external container datastore or service such as, but not limited to, Docker™, that enables building, distributing, and running containerized applications. An image repository provides images, which package up application code and dependencies into a standardized unit for software distribution and deployment. These images are stored in the image repositories or registries and can be downloaded to local systems. Applications running on the data platform 102 can reference and use services contained in images stored in an account's image repository.

In some examples, when analyzing an image directly, some tools of the image scanner 408 scan an entire image, while some tools analyze layers of the image separately. Since many layers used across providers are common base layers, scanning efforts are saved by either skipping known unmodified layers or reusing results between images that differ but use the same layer. A layer scanner applies to a single layer rather than the entire image. In some examples, for further performance improvements, layer image results may be reused across multiple layer scans that need to run as part of separate image scans by reading granular results from the granular application scan status table 422. Scanning is useful for dependency scanning as well as potentially helping to narrow down which files need to be extracted during extraction.

During execution, the image extractor 412 run tools to identify files to extract from the image, extract those files, then upload them to a datastore, such as image artifacts datastore 416, using a predefined path based on the image hash. The image extractor 412 is implemented as a separate RPC to allow setting timeouts and isolating heavy resource usage since extraction can be expensive. This architecture lets the image scan manager 414 reliably control the process flow. In addition, such an architecture avoids duplicate work since later scans may also need to pull the image. Performing image extraction as a separate step enables installing libraries in one place.

Once the application and image scans are scheduled, separate scan managers execute in parallel to execute one or more scans on an application and its related image.

In some examples, a scan manager software object has functionality settable by flags, depending on whether an instantiated scan manager is to handle application scans, such as application scan manager 434, or image scans, such as image scan manager 414. For image scan managers, result processor logic is disabled that determines whether to approve an application when complete and the image scan manager writes updates to an image scan status table 424. For application scan managers, the result processor logic is enabled to approve or reject an application and logic is enabled to prevent a scan from completing until all relevant image scans are also complete. Both an image scan manager and an application scan manager read and write granular rows from the same granular application scan status table 422, and an image scan manager uses the applications scan ID when recording a scan ID.

In operation 440, the image scan manager 414 polls for an image to scan. For example, the image scan manager 414 periodically checks the image scan status table 424 for any image scans that are in a PENDING state and ready to be run. The image scan manager 414 will look at timestamps to determine if enough time has passed since the image scan was last attempted. If so, the image scan manager 414 will claim the image scan by updating the record's lock timestamp and schedule fields to indicate that it is now processing this scan.

In operations 442 and 444, the image scan manager 414 determines if image extraction is complete. For example, the image scan manager 414 checks the status of the image extraction process before proceeding with the image scan. Specifically, the image scan manager 414 queries the image extraction status table 428 to see if there is a record for the image being scanned. If there is no record, then extraction has not yet started. If there is a PENDING record, the image scan manager 414 will wait and check back later to see if the status has changed. Once the record shows a SUCCESS status and has the path to the extracted files populated, the image scan manager 414 will determine that extraction was completed successfully by the image extractor 412 component. At this point, the image scan manager 414 will then continue the scan workflow and invoke scanners on the extracted source files. By explicitly checking if extraction is done, the image scan manager 414 avoids wasting resources scanning an image that has not been processed yet.

In operation 446, in response to determining that the image has not been extracted, the image scan manager 414 invokes an image extractor 412 of an anti-abuse image service 470 to extract image artifacts to an image artifact datastore 416 from the image to be scanned. For example, the image extractor 412 retrieves an image from a datastore. The image extractor 412 determines what artifacts to scan from the image, and extracts image artifacts to be scanned into a temporary image artifact datastore 416 location of the scan account 430. Once extraction is complete, the image extractor 412 writes a success record to the image extraction status table 428 containing the output image artifacts datastore 416 path. At this point, the image scan manager 414 will be able to detect that extraction was completed, and proceed with invoking scanners over the extracted image artifacts in the image artifacts datastore 416. This optimized process ensures image artifacts are extracted from a new image only once before scanning.

In operation 448, the image scan manager 414 executes an image scan to generate image scan results. For example, once the image scan manager 414 determines that image extraction is complete and all necessary source files have been pulled from the container image artifacts datastore 416, the image scan manager 414 initiates the image scanning process. This is done by invoking 466 the image scanner 408 component of the anti-abuse image service 470. The image scanner 408 contains the business logic to run configured rule sets and scanners against the image artifacts stored in the image artifacts data store 416 to detect potential threats or policy violations. When invoked, the image scanner 408 pulls the container image artifacts stored in the image artifacts datastore 416 that were previously extracted, as well as references the image in the image scan status table 424 to retrieve any cached scan results. The image scanner 408 then executes all enabled scanning rules and tools over the provided image artifacts in the image artifacts datastore 416, generating detailed image scan results. These image scan results contain verdicts and detections from each scanner, which are written back to the image scan status table 424 table to be eventually aggregated and correlated against the main application scan results.

In some examples, a scan manager avoids re-scanning the same image wastefully as much as possible. The architecture of the anti-abuse analysis pipeline 432 provides for extracting files from an image only once, the first time an image is scanned, and storing an image scan status independently from an application, allowing a scan manager to re-use image scan results for the same image used across multiple applications. In order to take advantage of these properties of the anti-abuse analysis pipeline 432, a scan manager includes logic to only call the image scanner 408 for images referenced in the application if there hasn't already been a recent image scan for that image's hash. If there has been, the scan manager will instead propagate a scan_image_id from the most recent image scan.

In operation 450, an application scan manager 434 polls for an application scan to run. For example, the application scan manager 434 periodically queries the application scan status table 426 to check if there are any application scans in a PENDING state, indicating they are ready to be processed. If the application scan manager 434 finds application scans that can be claimed based on timestamps and scheduling constraints, the application scan manager 434 will update the record to show that it is now actively working on that scan. This is done by setting the lock timestamp and clearing the schedule timestamp. Once the application scan manager 434 claims an application scan in this way, it will then proceed to invoke the necessary scanners and rules that were pre-calculated for this application, using the application artifacts datastore 418 provided. As scanners execute over the application codebase, the application scan manager 434 monitors their status and handles failures. When scans complete, the application scan manager 434 releases its claim on the record to allow other instances to pick it up for potential rescan. This polling process enables parallelized, asynchronous workflow handling.

In operation 452, the application scan manager 434 invokes an internal application scanner 410 of the anti-abuse internal service 406. In response, the anti-abuse internal service 406 executes an application scan to generate application scan results. For example, once the application scan manager 434 detects that an application scan is in a PENDING state and ready to be processed based on its polling, the application scan manager 434 will initiate the scanning workflow. This starts with the application scan manager 434 invoking the internal application scanner 410 component that is part of the anti-abuse internal service 406. When invoked, the internal application scanner 410 receives the details of the scan to perform, including references to the application artifacts datastore 418 containing the source code and manifests to be analyzed. The internal application scanner 410 executes all of the rules, scanners, and analyzers that are configured for application scanning, using the provided application artifacts datastore 418 as inputs. As it processes the application code, the internal application scanner 410 generates detailed application scan results, which capture verdicts, explanations, and scanner outputs. These application scan results contain the raw detections and analysis results needed to determine whether the application meets security and policy compliance standards. The application scan results are stored back to the granular application scan status table 422 table by the internal application scanner 410 upon completion.

In some examples, the anti-abuse analysis pipeline 432 provides a coordination between a primary application scan and one or more secondary image scans in order to fully analyze a submitted application package. The primary scan focuses on scanning the main application source code and manifests, while the one or more secondary scans analyze any images referenced by the application.

The application scan manager 434 is responsible for managing the primary scan. When it detects an application is ready for scanning, it will check if there are any images referenced in the manifest. For each unique image hash detected, it will either schedule a new secondary scan or look up the results of a previous scan if available. The application scan manager 434 tracks these dependencies using dependent_scan_ids field, which lists all secondary scan IDs that must complete before the primary scan can finish.

Meanwhile, the image scan manager 414 handles orchestrating and executing the secondary scans over images. This includes extracting source files and running configured scanners designed for images. The image scan manager 414 updates a status in the image scan status table 424 as secondary scans progress.

Once all secondary scans show complete in the image scan status table 424, the application scan manager 434 is unblocked and able to aggregate results from all primary and secondary scans using the scan IDs. This aggregation process generates an overall verdict on the safety and compliance of the application package as a whole. By separating concerns into primary and secondary scan managers, the anti-abuse analysis pipeline 432 can optimize and parallelize scanning complex applications.

In operations 454 and 456, the application scan manager 434 determines if all image scans are complete. For example, during the scanning process, the application scan manager 434 keeps track of which secondary image scans must complete before the primary application scan can finish. The application scan manager 434 periodically checks the status of the image scans in the image scan status table 424 table by looking up the unique scan IDs that were previously saved in the primary scan's dependent_scan_ids list. If any image scans are still in a pending or running state, the application scan manager 434 waits in operation 458 and continues monitoring the status of the image scans until they show completion. Once the application scan manager 434 confirms that all dependent secondary image scans over images show a finished status, it is then able to resume the primary application scan. This coordination step ensures that all image scan results will be available for aggregation before generating a final verdict on the application as a whole. By explicitly checking for scan completion in this way, the application scan manager 434 can orchestrate synchronous workflows across multiple image scan managers.

In operation 460, the application scan manager 434 analyzes the results of the image scans and the application scans to determine an overall scan results for the application package. For example, after the application scan manager 434 has confirmed that all secondary image scans have completed, the application scan manager 434 has all of the raw scan results available to proceed with the analysis phase. The application scan manager 434 provides aggregated scan results from both the primary application scan and secondary image scans as inputs. In some examples, the application scan manager 434 uses rules and logic to identify patterns across scan results from multiple scanners and source types to produce higher confidence abuse detections. As it analyzes the complete set of primary and secondary scan results, the application scan manager 434 generates detailed scan results that capture derived verdicts, explanations, scanner outputs, and confidence scores. The application scan manager 434 stores the scan results and updates the application scan status table 426 table. By analyzing scans in this way, the application scan manager 434 can produce more accurate determinations about the safety of complex applications composed of both code and images.

In some examples, one or more scanners are conditionally run depending on whether any scan categories relevant to that scanner are scheduled.

In some examples, when all categories to be scanned in the application ahead of time are unknown and an image needs to be extracted first, all scans are scheduled to run.

In some examples, when determining whether to approve or reject an image, the application scan manager 434 looks up previous manual overrides for the image name, rather than using the application package ID. Additionally, since this scan is for an image, the application scan manager 434 won't call system functions to approve or reject the application once complete. The application scan manager 434 handles image scan verdicts separately from application scan verdicts. By looking up previous manual review decisions based on the image name instead of package ID, application scan manager 434 can reuse image scan results and manual overrides across multiple applications that reference the same image. This avoids redundant scanning and reviews.

In some examples, when determining whether to approve or reject the application, the application scan manager 434 will only look up previous overrides for the app package ID that were part of a primary scan (excluding image scan verdicts). Additionally, the application scan manager 434 will check that all dependent image scans are finished as well, and if not, will check again later.

In some examples, once all image scans are complete, when the scan manager 434 decides whether to approve or reject the app, the scan manager 434 will use the most strict decision across the app scan and all image scans.

In some examples, the application scan manager 434 handles coordinating primary application scans with all secondary image scans. The application scan manager 434 bases its final application verdict on previous manual overrides that were part of primary scans, not secondary image scans.

In operation 468, the scan scheduler 402 continues to monitor the application packages offered by providers users of the data platform 102 to detect attempted malicious or faulty applications and processes. For example, the scan scheduler 402 has an ongoing responsibility to continually check for new application packages submitted by content providers to the data platform 102 marketplace. As the frontline defense against abuse, the scan scheduler 402 polls on a regular basis to detect any packages recently made available for installation. For each new application package it identifies, the scan scheduler 402 extracts relevant metadata like the provider name and passes this information to downstream services to initiate the automated scanning workflow. By persistently watching for newly offered applications in this way, the scan scheduler 402 can react in real-time to run security reviews on submissions before they are exposed to consumer accounts. This allows the scan scheduler 402 to play a crucial role in proactively identifying and blocking problematic or malicious applications at the source, before they have a chance to harm consumer users of the data platform 102 and the data platform 102 itself.

Figure 5:
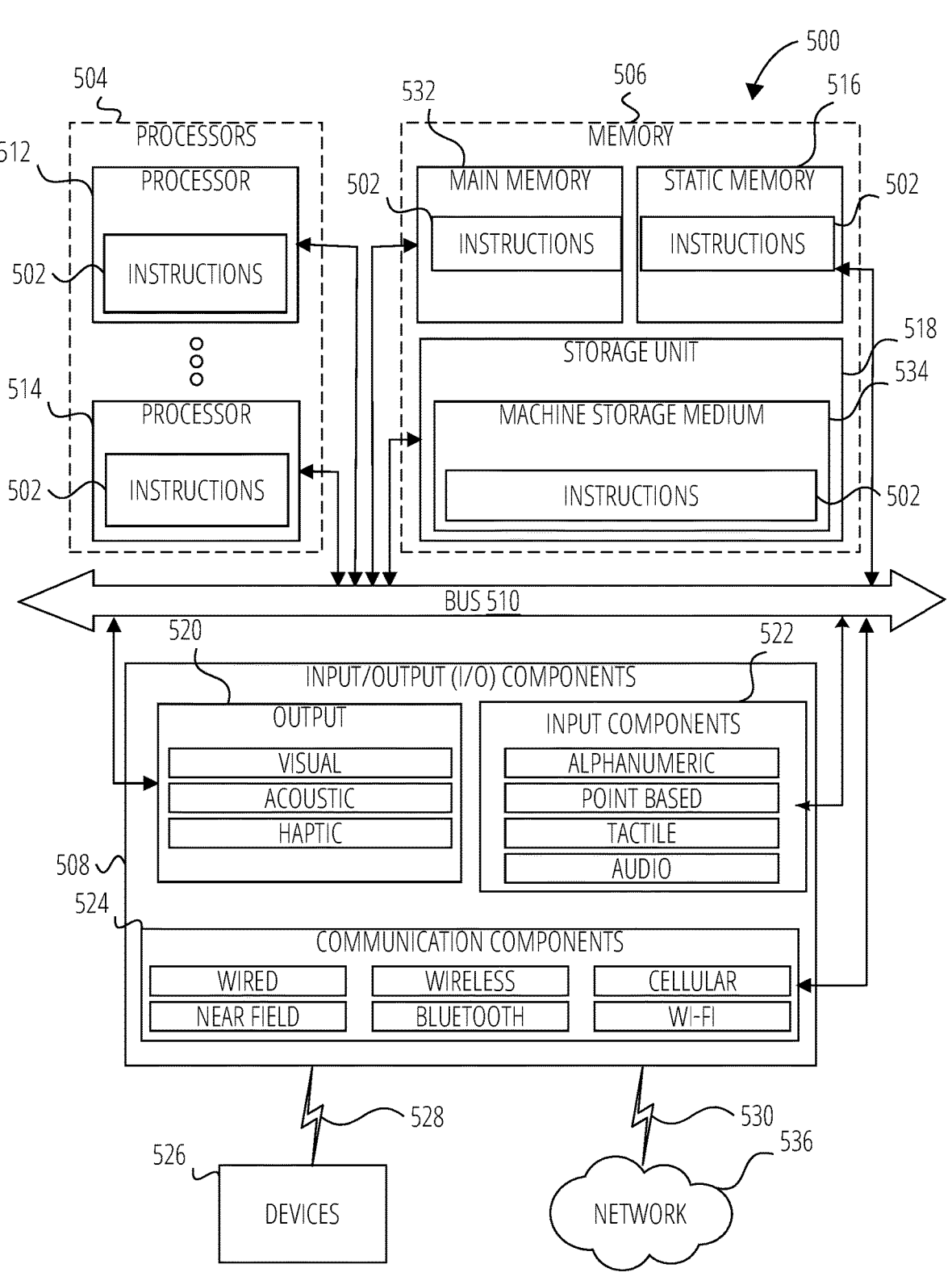
FIG. 5 illustrates a diagrammatic representation of a machine in the form of a computer system within which a set of instructions may be executed for causing the machine to perform any one or more of the methodologies discussed herein, according to some examples.

FIG. 5 illustrates a diagrammatic representation of a machine 500 in the form of a computer system within which a set of instructions may be executed for causing the machine 500 to perform any one or more of the methodologies discussed herein, according to examples. Specifically, FIG. 5 shows a diagrammatic representation of the machine 500 in the example form of a computer system, within which instructions 502 (e.g., software, a program, an application, an applet, a data application, or other executable code) for causing the machine 500 to perform any one or more of the methodologies discussed herein may be executed. For example, the instructions 502 may cause the machine 500 to execute any one or more operations of any one or more of the methods described herein. In this way, the instructions 502 transform a general, non-programmed machine into a particular machine 500 (e.g., the compute service manager 104, the execution platform 110, and the data storage devices 1 to N of data storage 106) that is specially configured to carry out any one of the described and illustrated functions in the manner described herein.

In alternative examples, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 502, sequentially or otherwise, that specify actions to be taken by the machine 500. Further, while only a single machine 500 is illustrated, the term "machine" shall also be taken to include a collection of machines that individually or jointly execute the instructions 502 to perform any one or more of the methodologies discussed herein.

The machine 500 includes hardware processors 504, memory 506, and I/O components 508 configured to communicate with each other such as via a bus 510. In some examples, the processors 504 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 512 and a processor 514 that may execute the instructions 502. The term "processor" is intended to include multi-core processors that may comprise two or more independent processors (sometimes referred to as "cores") that may execute instructions 502 contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory 506 may include a main memory 532, a static memory 516, and a storage unit 518 including a machine storage medium 534, all accessible to the processors 504 such as via the bus 510. The main memory 532, the static memory 516, and the storage unit 518 store the instructions 502 embodying any one or more of the methodologies or functions described herein. The instructions 502 may also reside, completely or partially, within the main memory 532, within the static memory 516, within the storage unit 518, within at least one of the processors 504 (e.g., within the processor's cache memory), or any suitable combination thereof, during execution thereof by the machine 500.

The input/output (I/O) components 508 include components to receive input, provide output, produce output, transmit information, exchange information, capture measurements, and so on. The specific I/O components 508 that are included in a particular machine 500 will depend on the type of machine. For example, portable machines such as mobile phones will likely include a touch input device or other such input mechanisms, while a headless server machine will likely not include such a touch input device. It will be appreciated that the I/O components 508 may include many other components that are not shown in FIG. 5. The I/O components 508 are grouped according to functionality merely for simplifying the following discussion and the grouping is in no way limiting. In various examples, the I/O components 508 may include output components 520 and input components 522. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 522 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 508 may include communication components 524 operable to couple the machine 500 to a network 536 or devices 526 via a coupling 530 and a coupling 528, respectively. For example, the communication components 524 may include a network interface component or another suitable device to interface with the network 536. In further examples, the communication components 524 may include wired communication components, wireless communication components, cellular communication components, and other communication components to provide communication via other modalities. The devices 526 may be another machine or any of a wide variety of peripheral devices (e.g., a peripheral device coupled via a universal serial bus (USB)). For example, as noted above, the machine 500 may correspond to any one of the compute service manager 104, the execution platform 110, and the devices 526 may include the data storage device 226 or any other computing device described herein as being in communication with the data platform 102 or the data storage 106.

The various memories (e.g., 506, 516, 532, and/or memory of the processor(s) 504 and/or the storage unit 518) may store one or more sets of instructions 502 and data structures (e.g., software) embodying or utilized by any one or more of the methodologies or functions described herein. These instructions 502, when executed by the processor(s) 504, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 536 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 536 or a portion of the network 536 may include a wireless or cellular network, and the coupling 530 may be a Code Division Multiple Access (CDMA) connection, a Global System for Mobile communications (GSM) connection, or another type of cellular or wireless coupling. In this example, the coupling 530 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 502 may be transmitted or received over the network 536 using a transmission medium via a network interface device (e.g., a network interface component included in the communication components 524) and utilizing any one of a number of well-known transfer protocols (e.g., hypertext transfer protocol (HTTP)). Similarly, the instructions 502 may be transmitted or received using a transmission medium via the coupling 528 (e.g., a peer-to-peer coupling) to the devices 526. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 502 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A machine-implemented method comprising:
detecting an image referenced in an application package;
scheduling an application scan to scan application source files of the application package and generate application scan results;
scheduling an image scan to scan the image and generate image scan results;
extracting one or more application source files from the application package;
executing the application scan to generate application scan results using the one or more application source files;
extracting one or more artifacts from the referenced image;
executing the image scan to generate the image scan results using the artifacts;
determining a completion of the application scan and the image scan; and
in response to determining the completion, generating a scan result using the application scan results and the image scan results.

2. The machine-implemented method of claim 1, wherein extracting the one or more application source files comprises:
identifying one or more relevant directories in referenced image; and
extracting files from the identified one or more relevant directories.

3. The machine-implemented method of claim 1, further comprising:
storing the application scan results and the image scan results in association with the referenced image.

4. The machine-implemented method of claim 1, wherein scheduling the application scan comprises:
analyzing a manifest associated with the application package to identify dependencies;
selecting one or more secondary scans of the image based on the identified dependencies.

5. The machine-implemented method of claim 1, wherein scheduling the image scan comprises:
selecting scanners configured to scan images.

6. The machine-implemented method of claim 1, further comprising:
aggregating the application scan results and the image scan results to generate the scan result.

7. The machine-implemented method of claim 1, further comprising:
generating an overall scan verdict using the scan result.

8. The machine-implemented method of claim 7, wherein generating the overall scan verdict comprises:
selecting a restrictive verdict between the application scan results and the image scan results.

9. The machine-implemented method of claim 1, further comprising:
determining whether the image has been previously scanned;
in response to determining the image has been previously scanned, accessing previous image scan results for the image; and
using the previous scan results as the image scan results.

10. The machine-implemented method of claim 1,
wherein the application scan is performed by an application scan manager;
wherein the image scan is performed by an image scan manager; and
wherein the image scan manager and the application scan manager are separate scan managers executing in parallel.

11. A data platform comprising:
at least one processor; and
at least one memory storing instructions that, when executed by the at least one processor, cause the data platform to perform operations comprising:
detecting an image referenced in an application package;
scheduling an application scan to scan application source files of the application package and generate application scan results;
scheduling an image scan to scan the image and generate image scan results;
extracting one or more application source files from the application package;
executing the application scan to generate application scan results using the one or more application source files;
extracting one or more artifacts from the referenced image;
executing the image scan to generate the image scan results using the artifacts;

determining a completion of the application scan and the image scan; and in response to determining the completion generating a scan result using the application scan results and the image scan results.

12. The data platform of claim 11, wherein extracting the one or more application source files comprises:

identifying one or more relevant directories in referenced image; and extracting files from the identified one or more relevant directories.

13. The data platform of claim 11, wherein the operations further comprise:

storing the application scan results and the image scan results in association with the referenced image.

14. The data platform of claim 11, wherein scheduling the application scan comprises:

analyzing a manifest associated with the application package to identify dependencies;

selecting one or more secondary scans of the image based on the identified dependencies.

15. The data platform of claim 11, wherein scheduling the image scan comprises:

selecting scanners configured to scan images.

16. The data platform of claim 11, wherein the operations further comprise:

aggregating the application scan results and the image scan results to generate the scan results.

17. The data platform of claim 11, wherein the operations further comprise:

generating an overall scan verdict based on the scan result.

18. The data platform of claim 17, wherein generating the overall scan verdict comprises:

selecting a restrictive verdict between the application scan results and the image scan results.

19. The data platform of claim 11, wherein the operations further comprise:

determining whether the image has been previously scanned;

in response to determining the image has been previously scanned, accessing previous image scan results for the image; and using the previous scan results as the image scan results.

20. The data platform of claim 11, wherein the application scan is performed by an application scan manager;

wherein the image scan is performed by an image scan manager; and wherein the image scan manager and the application scan manager are separate scan managers executing in parallel.

21. A machine-storage medium comprising instructions that, when executed by one or more processors of a machine, cause the machine to perform operations comprising:

detecting an image referenced in an application package;

scheduling an application scan to scan application source files of the application package and generate application scan results;

scheduling an image scan to scan the image and generate image scan results;

extracting one or more application source files from the application package;

executing the application scan to generate application scan results using the one or more application source files;

extracting one or more artifacts from the referenced image;

executing the image scan to generate the image scan results using the artifacts;

determining a completion of the application scan and the image scan; and in response to determining the completion, generating a scan result using the application scan results and the image scan results.

22. The machine-storage medium of claim 21, wherein extracting the one or more application source files comprises:

identifying one or more relevant directories in referenced image; and extracting files from the identified one or more relevant directories.

23. The machine-storage medium of claim 21, wherein the operations further comprise:

storing the application scan results and the image scan results in association with the referenced image.

24. The machine-storage medium of claim 21, wherein scheduling the application scan comprises:

analyzing a manifest associated with the application package to identify dependencies;

selecting one or more secondary scans of the image based on the identified dependencies.

25. The machine-storage medium of claim 21, wherein scheduling the image scan comprises:

selecting scanners configured to scan images.

26. The machine-storage medium of claim 21, wherein the operations further comprise:

aggregating the application scan results and the image scan results to generate the scan result.

27. The machine-storage medium of claim 21, wherein the operations further comprise:

generating an overall scan verdict based on the scan result.

28. The machine-storage medium of claim 27, wherein generating the overall scan verdict comprises:

selecting a restrictive verdict between the application scan results and the image scan results.

29. The machine-storage medium of claim 21, wherein the operations further comprise:

determining whether the image has been previously scanned;

in response to determining the image has been previously scanned, accessing previous image scan results for the image; and using the previous scan results as the image scan results.

30. The machine-storage medium of claim 21, wherein the application scan is performed by an application scan manager;

wherein the image scan is performed by an image scan manager; and wherein the image scan manager and the application scan manager are separate scan managers executing in parallel.

* * * * *